United States Patent [19]

Birnbaum

[11] Patent Number: 5,802,083
[45] Date of Patent: Sep. 1, 1998

[54] SATURABLE ABSORBER Q-SWITCHES FOR 2-μM LASERS

[75] Inventor: Milton Birnbaum, 4904 Elkridge Dr., Rancho Palos Verdes, Calif. 90275

[73] Assignee: Milton Birnbaum, Rancho Palos Verdes, Calif.

[21] Appl. No.: 570,719

[22] Filed: Dec. 11, 1995

[51] Int. Cl.[6] .................................................. H01S 3/113
[52] U.S. Cl. .................................................. 372/11; 372/41
[58] Field of Search ................................. 372/10, 11, 39, 372/41, 69, 70, 98, 12, 68

[56] References Cited

U.S. PATENT DOCUMENTS

| | | | |
|---|---|---|---|
| 4,110,702 | 8/1978 | Chicklis | 372/12 |
| 5,008,890 | 4/1991 | McFarlane | 372/41 |
| 5,088,103 | 2/1992 | Esterowitz et al. | 372/39 |
| 5,278,855 | 1/1994 | Jacobvitz-Veselka et al. | 372/11 |
| 5,287,378 | 2/1994 | Bowman et al. | 372/68 |
| 5,289,482 | 2/1994 | Esterowitz et al. | 372/68 |
| 5,394,413 | 2/1995 | Zayhowski | 372/11 |
| 5,495,494 | 2/1996 | Molva et al. | 372/98 |
| 5,502,737 | 3/1996 | Chartier et al. | 372/11 |
| 5,541,948 | 7/1996 | Krupke et al. | 372/41 |

FOREIGN PATENT DOCUMENTS

0523861A2  1/1993  European Pat. Off. ............. 372/22

OTHER PUBLICATIONS

Kou et al;"Ho:YLiF$_4$ saturable absorber Q-switch for the 2μm Tm,Cr:Y$_3$Al$_5$O$_{12}$ Laser";Appl.Phys.Lett. 65(24);12 Dec. 1994.

Primary Examiner—Leon Scott, Jr.

[57] ABSTRACT

A laser system includes a laser resonator cavity having a resonant axis and a lasing element within the laser resonator cavity. The lasing element emits, under stimulation, light at a wavelength of from about 1.6 to about 2.3 micrometers. There is a flash lamp, laser diodes or other pumping devices, which optically pump the lasing element to emit laser light. A Q-switch crystal lies along the resonant axis within the laser resonator cavity. The Q-switch crystal is formed of a host material having a concentration of Ho$^{3+}$ ions therein, so as to be a saturable absorber of light of a wavelength of about 2.0–2.1 micrometers. The Q-switch crystal is preferably Ho$^{3+}$-doped yttriumlithium-fluoride, or Ho$^{3+}$-doped yttrium-vanadate. In another embodiment, the Q-switch crystal is preferably Cr$^{2+}$:fosterite (Mg$_2$SiO$_4$).

4 Claims, 1 Drawing Sheet

Passive Q-switching experimental setup.

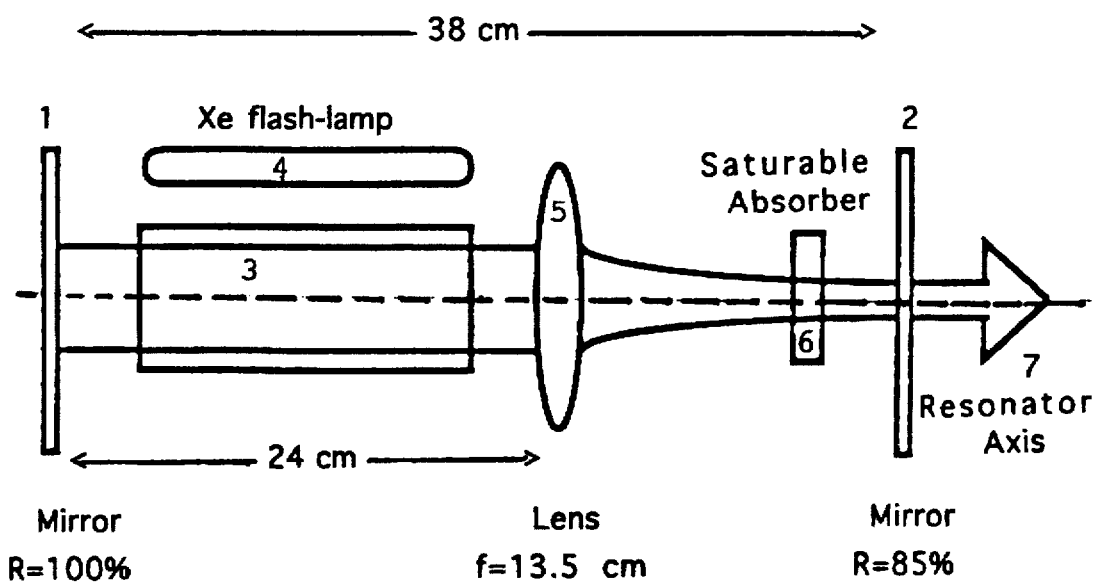
Fig. 1. Passive Q-switching experimental setup.

SATURABLE ABSORBER Q-SWITCHES FOR 2-μM LASERS

BACKGROUND OF THE INVENTION

1. Field of the Invention

This invention relates to lasers, in particular, to Q-switched lasers utilizing a passive Q-switch.

2. Prior Art and Background

Q-switching of solid-state lasers is important because it provides short duration optical pulses required for laser ranging, nonlinear studies, medicine, and other important applications. Passive Q-switching using a solid-state saturable absorber Q-switch is economical, simple and practical when compared to active Q-switching, which uses electrooptic or acoustooptic devices and electronic driving circuitry. The advantage of passive Q-switching inheres in its simplicity, reliability and economy compared to active methods. In this invention, the technique of passive Q-switching is extended to solid state laser operation at approximately 2-μm. There is an extensive literature on passive Q-switching in which the theory and criteria for passive Q-switching[1] are explained. References to the pertinent literature are given in Ref. 1.

A typical arrangement for a saturable absorber Q-switched solid state laser is shown in FIG. 1. Briefly, at low laser intensity, the saturable absorber (S.A.) (6 of FIG. 1) has a high absorption at the laser wavelength usually from approximately 20 to 50%. Absorption of laser light causes "bleaching" (reduced absorption) of the S.A. (6 of FIG. 1) which results in an increase in the intensity of the laser light. This process continues until the S.A. (6 of FIG. 1) is fully bleached. Thus, the S.A. (6 of FIG. 1) acts as a shutter and the laser emits a Q-switched pulse usually approximately 20–80 ns ($10^{-9}$s) and is dependent upon the design of the laser resonator, the distance between the two mirrors. The dynamics of the process involving the numerical solution of the coupled differential equations are given in Ref. 1 and in the papers cited in Ref. 1.

Saturable absorbers are generally of two types: slow and fast. The designation slow refers to the case where the relaxation time, $\tau_A$ of the S.A. (6 of FIG. 1) is greater than the lifetime $\tau_C$ of a photon in the laser resonator, and fast refers to the case where the $\tau_A < \tau_C$. In this disclosure, the S.A. absorbers are "slow". In general, the laser parameters and laser pump duration together with the S.A.–$\tau_A$ are selected so that the output consists of a single giant-pulse or Q-switched pulse. A range of parameters can be found which results in the emission of several Q-switched pulses at mega Hz repetition rates. There are applications in which multiple pulsations are desired.

Saturable absorbers Q-switches are widely used for Nd-doped laser crystals operating at ~1 μm and have recently been developed for crystal and glass lasers operating at ~1.5–1.6 μmm.[2,3] The focussing lens 5 is sometimes used to facilitate the Q-switched operation. However, similar results can be obtained if the plane parallel resonator is replaced by hemispherical or confocal resonator geometry. These design variations are common knowledge to laser designers.

The lasing material (3) shown in FIG. 1 can be in the form of a rod. In many design variants lasing material in the form of a slab, disk, and prism can be used and are familiar to laser designers. The laser material must be energized or pumped and in FIG. 1 a Xe flash-lamp (4) is shown as the laser pump. Again, the pump could be a laser diode, laser diode arrays, or a variety of optical pumps or lasers which will generally be known to the laser designer. An important criterion for saturable absorber Q-switching follows from the rate equations.[4]

$$\frac{\sigma_A}{\sigma_L} \frac{A_L}{A_A} > 1 \quad (1)$$

which holds for a "slow" saturable absorber, namely the lifetime $\tau_S$ of the excited state of the S.A. is long compared to the photon cavity lifetime, $\tau_C$ ($\tau_{SA} > \tau_C$). All of the saturable absorbers described in this disclosure are "slow": S.A.=Saturable absorber, S.As.=Saturable absorbers.

In eq. (1), the symbols are defined as follows: $\sigma_A$ is the absorption cross section for the S.A. at the laser wavelength; $\sigma_L$, the stimulated emission cross section for the lasing ion transition; $A_A$, the laser beam cross sectional in the S.A. and $A_L$, the laser beam cross sectional area in the laser crystal. When the lens is removed from the Q-switched laser of FIG. 1, $A_A = A_L$. For operation without focussing elements, $\sigma_A > \sigma_L$ must hold. Other focussing arrangements such as use of a hemispherical resonator geometry in which mirror 1 is replaced by a highly reflective concave mirror of appropriate focal length. In this case $A_A < A_L$ which is generally required when $\sigma_A/\sigma_L$ is close to unity or less than unity. The design of hemispherical laser resonators is well known to laser engineers.

BRIEF DESCRIPTION OF DIAGRAM (FIG. 1)

The saturable absorber Q-switched laser embodiment shown in FIG. 1 consists essentially of a laser resonator M(1) total reflector (100% reflectivity) at the laser output wavelength; M(2) partial reflector at the laser output wavelength; laser crystal (3) of Tm,Cr:YAG; a flash lamp (4) to pump or energize the laser material; a lens (5) which focusses the intracavity laser output into the saturable absorber Q-switch and the saturable absorber Q-switch (6).

INVENTION DESCRIPTION

This invention describes and has reduced to practice saturable absorber Q-switches for 2 μm lasers. Several have been reduced to practice and are listed in this disclosure. The reduction to practice has been demonstrated with a Tm,Cr:YAG laser operating at 2.017 μm. The saturable absorbers successfully demonstrated were Ho:YLiF$_4$ (described in detail in Ref. 4), Ho:YVO$_4$[5] and Ho:CaF$_2$.[6] The scope of this invention is considerably extended by utilization of new saturable absorbers. In particular, Cr$^{2+}$:Mg$_2$SiO$_4$ fosterite. This material has a strong absorption over the range (approx.) 1.5 μm–2.3 μm. With a Cr$^{2+}$:fosterite crystals, saturable absorbers could be obtained for the lasers listed in Table 1.

TABLE 1

|  |  | μm |
|---|---|---|
| Tr$^{3+}$ | silicate glass | 2.015 |
| Ho$^{3+}$ | YVO$_4$ | 2.04 |
| Ho$^{3+}$ | LiYF$_4$ | 2.05 |
| Co$^{2+}$ | MgF$_2$ | 2 |
| Ho$^{3+}$ | silicate glass | 2.06–2.10 |
| Ho$^{3+}$ | BaYb$_2$F$_6$ | 2.06–2.07 |
| Ho$^{3+}$ | fluorozirconate glass | 2.08 |
| Ho$^{3+}$ | YAlO$_3$ | 2.12 |
| U$^{3+}$ | CaF$_2$ | 2.23 |

The above is but a partial list and other lasers covering the wavelength band of approximately 1.6 to 2.3 μm known to practitioners can be Q-switched with S.As utilizing Cr$^{2+}$:fosterite, an arrangement exemplified by FIG. 1.

S.A. Q-switching provides the following advantages: (1) The S.A. apertures the laser beam restricting off-axis modes with the result that the output beam is TEM$_{00q}$ or lowest order transverse mode which results in minimum diffraction of the laser beam (desired in most applications), and (2) the S.A. Q-switched laser is spectrally narrowed compared to the free-running laser output.

It is clear from eq. 1, that if $\sigma_A/\sigma_L \approx 1$ or <1, focussing will be required, i.e. $A_L/A_A > 1$ to satisfy eq. 1. In practical cases, focussing will be required when $\sigma_A/\sigma_L \approx 1$ to compensate for additional losses which are almost always present in the laser and S.A. materials. Thus even though for the S.A. crystals reduced to practice, i.e. Ho:YLF, Ho:YVO$_4$ and HoCaF$_2$ the ratio $\sigma_A/\sigma_L$ was greater than 1 but only in the range of 1–3 focussing was required for good Q-switched operation. Instead of a lens, a hemispherical resonator arrangement may be used.

For some of the newer materials (not yet reduced to practice) spectrscopic evidence shows that for most of the lasers of Table 1, $\sigma_A/\sigma_L >> 1$ and therefore, a lens will not be required.

REFERENCES

1. Yen-Kuang Kuo, Man-Fang Huang, and Milton Birnbaum, Fellow, IEEE, "Tunable Cr$^{4+}$:YSO Q-Switched Cr:LiCAF Laser," IEEE J. Quantum Electron., Vol. 31, No. 4, April 1995, pp. 657–663.

2. R. D. Stultz, M. B. Camargo, S. T. Montgomery, M. Birnbaum, and K. Spariosu, "U$^{3+}$:Sr F$_2$ Efficient Saturable Absorber Q Switch for the 1.54 μm Erbium:Glass Laser," Appl. Phys. Lett., Vol 64, 1994, pp. 948–950.

3. K. Spariosu, R. D. Stultz, M. Birnbaum, T. H. Allik, and J. A. Hutchinson, "Er:Ca$_5$(PO$_4$)$_3$F Saturable-absorber Q Switch for the Erbium:Glass Laser at 1.53 μm," Appl. Phys. Lett., Vol. 62, 1993, pp. 2763–2765.

4. Y. K. Kuo, M. Birnbaum, and W. Chen, "HoLiYF$_4$ Saturable Absorber Q-Switch for the 2-μm Tm,Cr:Y$_3$Al$_5$O$_{12}$ Laser," Appl. Phys. Lett., Vol. 65, No. 24, 12 Dec. 1994, pp. 3060–3062.

5. Y. K. Kuo and M. Birnbaum, submitted for publication.

6. Y. K. Kuo, M. Birnbaum, F. Unlu, and M.-F. Huang, submitted for publication.

What I claim is:

1. A laser system, comprising:
    a laser resonator cavity having a resonant axis;
    a lasing element within the laser resonator cavity, said lasing element selected from group of materials consisting essentially of: Cr,Tm:yttrium aluminum garnet (YAG), Tm:YAG, Tm:silicate glass, Ho$^{3+}$:YVO$_4$, Ho$^{3+}$:LiYF$_4$, Co$^{2+}$:MgF$_2$, Ho$^{3+}$:silicate glass, Ho$^{3+}$:BaYb$_2$F$_8$, Ho$^{3+}$:fluorozirconate glass, Ho$^{3+}$:YAlO$_3$, or U$^{3+}$:CaF$_2$;
    means for optically pumping the lasing element; and
    a saturable-absorber Q-switch lying along the resonant axis within the laser resonator cavity, the saturable absorber Q-switch comprising a host material selected from a group consisting essentially of: Ho$^{3+}$:YLF, Ho$^{3+}$:YVO$_4$, Ho$^{3+}$:CaF$_2$, Cr$^{2+}$:fosterite (Mg$_2$SiO$_4$), Co$^{2+}$:MgAl$_2$O$_4$, Ni$^{2+}$:ZnS, ZnSe, ZnTe, ZnS$_x$Se$_{1-x}$, and ZnSe$_x$Te$_{1-x}$, to thereby produce a 2 micron Q-switch laser.

2. The laser system of claim 1, wherein the laser resonator cavity comprises:
    a curved mirror at a first end thereof, the curved mirror having a reflectivity of substantially 100 percent, and
    a flat mirror at a second end thereof, the flat mirror having a reflectivity of substantially less than 100 percent, and wherein the Q-switch is positioned between the lasing element and the flat mirror, such that a ratio of an absorption cross section of the saturable absorber to a lasing element emission cross section multiplied by a ratio of the laser beam cross-sectional area to a beam area within the Q-switch is greater than one.

3. The laser system of claim 2, further including:
    a converging lens positioned between the lasing element and the Q-switch to substantially reduce the beam area within the Q-switch.

4. The laser system of claim 1, where the laser resonator comprises:
    a flat mirror at a first end thereof, the flat mirror having a reflectivity of substantially 100 percent; and
    a flat outcoupler mirror at a second end thereof, the flat outcoupler mirror having a reflectivity of less than 100 percent, and
    wherein the Q-switch crystal is positioned between the lasing element and the flat outcoupler mirror.

* * * * *